United States Patent
Penner et al.

(10) Patent No.: US 11,336,693 B2
(45) Date of Patent: May 17, 2022

(54) APPLYING APPLICATION LAYER POLICY TO TRANSPORT LAYER SECURITY REQUESTS SYSTEMS AND METHODS

(71) Applicant: Citrix Systems, Inc., Fort Lauderdale, FL (US)

(72) Inventors: Andrew Penner, Savoy, IL (US); Tushar Kanekar, Fremont, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 248 days.

(21) Appl. No.: 16/203,120

(22) Filed: Nov. 28, 2018

(65) Prior Publication Data

US 2020/0169584 A1    May 28, 2020

(51) Int. Cl.
| | |
|---|---|
| *H04L 29/06* | (2006.01) |
| *G06F 9/455* | (2018.01) |
| *H04L 67/02* | (2022.01) |
| *H04L 67/141* | (2022.01) |
| *H04L 67/01* | (2022.01) |

(52) U.S. Cl.
CPC ........... *H04L 63/20* (2013.01); *H04L 63/166* (2013.01); *H04L 63/168* (2013.01); *G06F 9/45533* (2013.01); *H04L 67/02* (2013.01); *H04L 67/141* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 2011/0154026 A1 | 6/2011 | Edstrom et al. | |
| 2013/0007194 A1* | 1/2013 | Doleh | H04L 67/142 709/217 |
| 2013/0042100 A1* | 2/2013 | Bouazizi | H04N 21/6543 713/151 |
| 2016/0330076 A1 | 11/2016 | Tiwari et al. | |
| 2018/0213038 A1* | 7/2018 | Chung | H04L 12/1471 |

OTHER PUBLICATIONS

International Search Report and Written Opinion for International Appl. No. PCT/US2019/062027, dated Feb. 10, 2020.

(Continued)

*Primary Examiner* — Benjamin E Lanier
(74) *Attorney, Agent, or Firm* — Foley & Lardner LLP

(57) ABSTRACT

Systems and methods for applying an application layer policy to a transport layer security request are provided. A device, intermediary to one or more clients and one or more servers, can receive a transport layer security (TLS) request to establish a TLS connection between a client of the one or more clients and a server of the one or more servers. The TLS request can include an application layer request to a resource of the server. The device can apply an application layer policy to the application layer request of the TLS request. The device can determine, responsive to applying the application layer policy, whether to one of accept or reject at least the application layer request of the TLS request.

20 Claims, 9 Drawing Sheets

(56) References Cited

OTHER PUBLICATIONS

Rescorla, E., "The Transport Layer Security (TLS) Protocol Version 1.3; rfc8446.txt", The Transport Layer Security (TLS) Protocol Version 1.3; RFC8446.txt, Internet Engineering Task Force, IETF; Standard, Internet Society (ISOC) 4, Rue Des Falaises CH-1205 Geneva, Switzerland, Aug. 11, 2018 (Aug. 11, 2018), pp. 1-160, XP015126376, [retrieved on Aug. 11, 2018].

Thomson, M., et al., "Using Early Data in HTTP; draft-ietf-httpbis-replay-04.txt", Using Early Data in HTTP; draft-ietf-httpbis-replay-04.TXT; Internet-Draft: HTTP, Internet Engineering Task Force, IETF; Standardworkingdraft, Internet Society (ISOC) 4, Rue Des Fala I Ses CH-1205 Geneva, Switzerland, No. 4, Jun. 28, 2018 (Jun. 28, 2018), pp. 1-12, XP015127143, [retrieved on Jun. 28, 2018].

International Preliminary Report on Patentability on PCT Appl. No. PCT/US2019/062027 dated Jun. 10, 2021.

Examination Report on AU Appl. No. 2019385805 dated Feb. 2, 2022.

\* cited by examiner

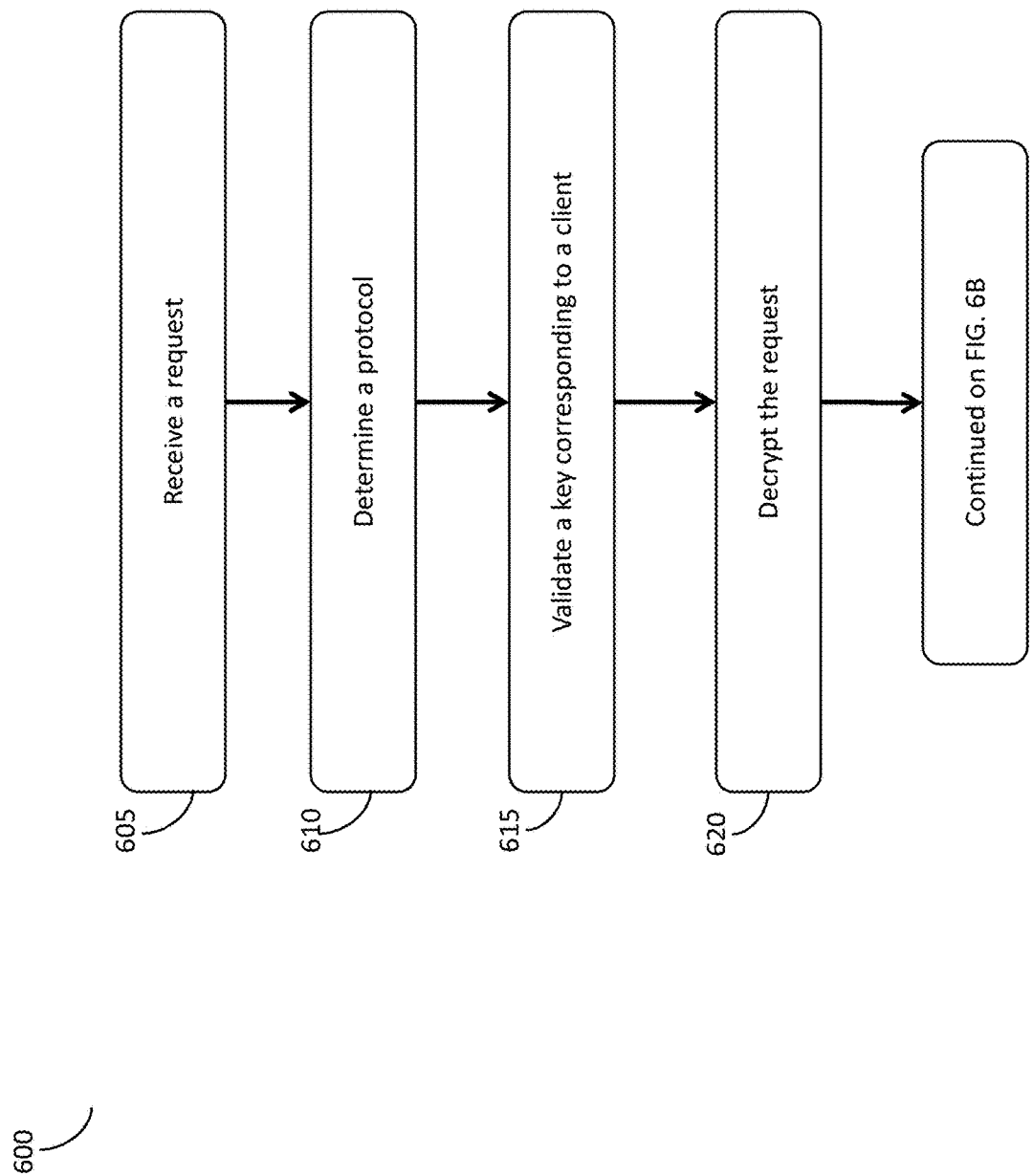

APPLYING APPLICATION LAYER POLICY TO TRANSPORT LAYER SECURITY REQUESTS SYSTEMS AND METHODS

BACKGROUND

In many server deployments, users transmit sensitive or encrypted data over a network to a server. The transmission can be maliciously or fraudulently repeated or delayed in the form of a replay attack. For example, two or more identical copies of a request may be processed if the requests arrive at different servers. Thus, in many server deployments, it can become increasingly difficult to determine which client requests have been seen before. Many server protocols may not provide sufficient protection against a network attacker who makes a copy of the client request and replays it to the server at a later time.

SUMMARY

Systems and methods for applying an application layer policy to a transport layer security request are provided. A device can be disposed intermediary to one or more clients and one or more servers to proxy requests for resources provided by the one or more servers and requested by the one or more client devices. The device (e.g., proxy server) can include a transport layer security (TLS) server and a policy engine to selectively allow or reject early data request processing dynamically for requests received from one or more client devices. The requests can include a TLS request and an application layer request for a resource provided by the one or more servers. The device can apply application layer policies to the application layer request to determine whether to allow or reject early data requests for the resource indicated in the application layer request. In some embodiments, the application layer policy can indicate that the requested resource is replay-safe and include a policy to allow early data processing the respective resource. In some embodiments, the application layer policy can indicate that the requested resource is not replay-safe and include a policy to reject or disallow early data processing the respective resource. Thus, the device can provide protection for the one or more servers (e.g., application servers) from early data replay attacks by proxying TLS requests and application layer requests together. The device can use the application layer policies to provide precise control of speed versus security tradeoffs for early data request processing based at least in part on polices applied to the respective requests.

In a first aspect, a method for applying an application layer policy to a transport layer security request is provided. The method can include receiving, by a device intermediary to one or more clients and one or more servers, a transport layer security (TLS) request to establish a TLS connection between a client of the one or more clients and a server of the one or more servers. The TLS request can include an application layer request to a resource of the server. The method can include applying, by the device, an application layer policy to the application layer request of the TLS request. The method can include determining, by the device responsive to applying the application layer policy, whether to one of accept or reject at least the application layer request of the TLS request.

In some embodiments, the method can include decrypting, by the device, the application layer request using at least one key included within the TLS request. The method can include identifying, by the device based at least on the TLS request, the application layer policy for accessing the resource. The application layer policy can specify a pattern for matching against at least a portion of the application layer request. The application layer request can include a HyperText Transfer Protocol (HTTP) request. The method can include terminating, at the device, the TLS connection with the client and establishing a communication channel between the device and the server.

In some embodiments, the method can include rejecting the application layer request but accepting the TLS request. The method can include omitting, by the device, an extension for early data during a TLS handshake with the client to indicate rejection of the application layer request. In some embodiments, the method can include accepting both the TLS request and the application layer request. The device may include an extension for early data during a TLS handshake with the client to indicate allowing the application layer request.

In at least one aspect, a system for applying an application layer policy to a transport layer security request is provided. The system can include a device intermediary to one or more clients and one or more servers. The device can be configured to receive a transport layer security (TLS) request to establish a TLS connection between a client of the one or more clients and a server of the one or more servers. The TLS request can include an application layer request to a resource of the server. The device can be configured to apply an application layer policy to the application layer request of the TLS request and determine responsive to applying the application layer policy, whether to one of accept or reject at least the application layer request of the TLS request.

The device can be configured to decrypt the application layer request using at least one key included within the TLS request. The device can be configured to identify, based at least on the TLS request, the application layer policy for accessing the resource. The application layer policy can be configured with a pattern for matching against at least a portion of the application layer request. The application layer request can include a HyperText Transfer Protocol (HTTP) request. The device can be further configured to terminate the TLS connection with the client and establishing a communication channel between the device and the server.

In some embodiments, the device can be configured to reject the application layer request but accept the TLS request. The device can be configured to omit an extension for early data during a TLS handshake with the client to indicate rejection of the application layer request. The device can be configured to accept both the TLS request and the application layer request. In some embodiments, the device can be configured to include an extension for early data during a TLS handshake with the client to indicate allowing the application layer request.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 1A is a block diagram of a network computing system, in accordance with an illustrative embodiment;

FIGS. 6A-6B are a flow diagram of a method for applying application layer policy to a transport layer security request.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for applying application layer policy to a transport layer security request.

A. Network and Computing Environment

Figure 1A:
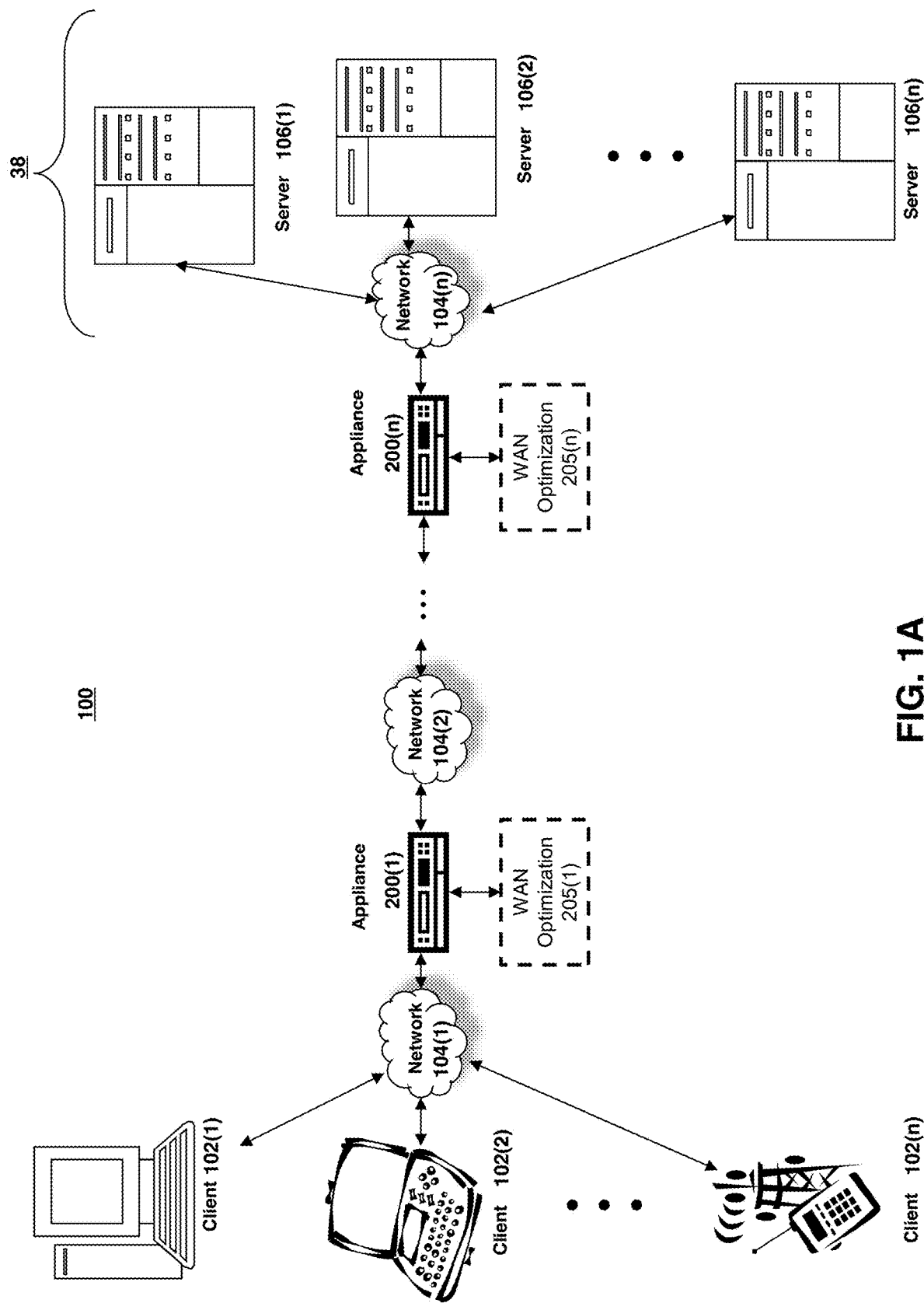
FIG. 1B is a block diagram of a network computing system for delivering a computing environment from a server to a client via an appliance, in accordance with an illustrative embodiment.
FIG. 1C is a block diagram of a computing device, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
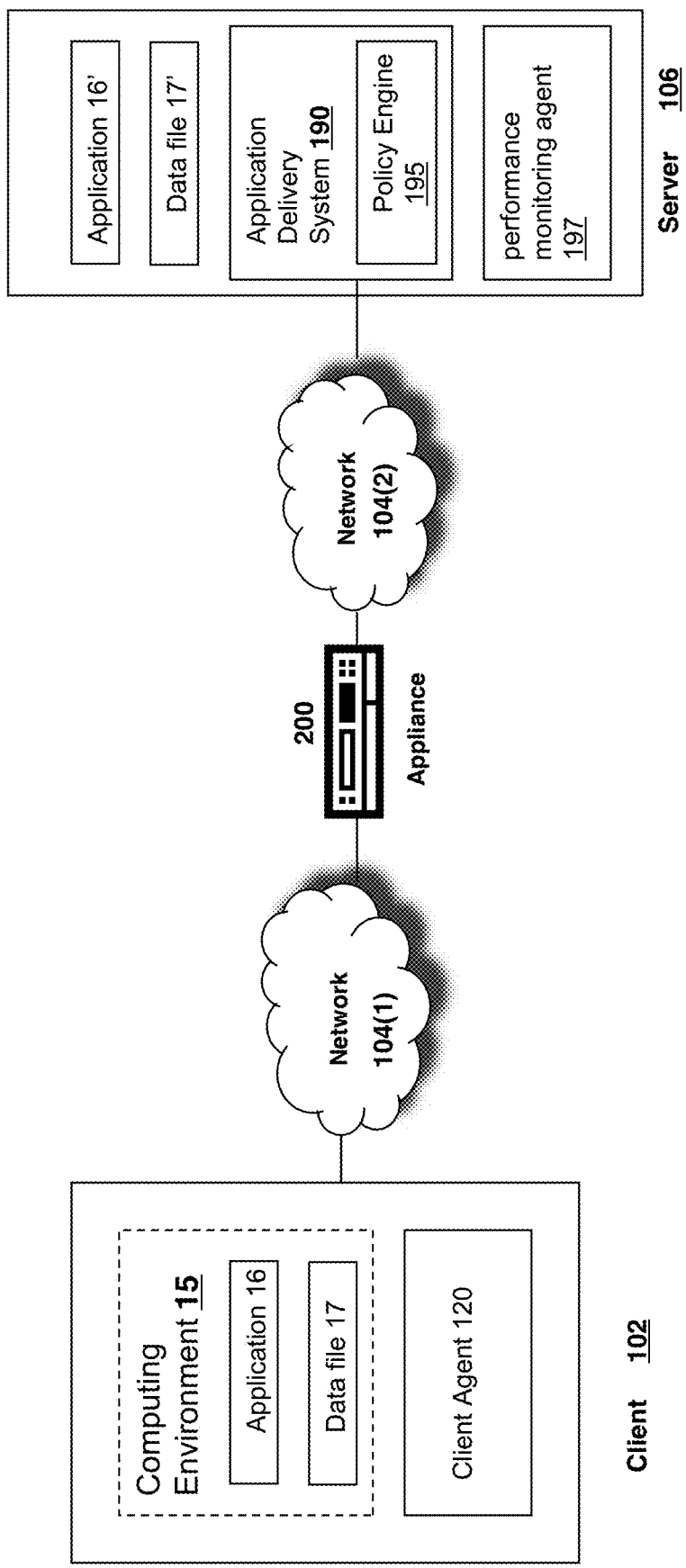

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 50 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 50), servers 106 (e.g., agent 197) or an appliance 200 and/or 205 (agent not shown). In general, monitoring agents (e.g., 50 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
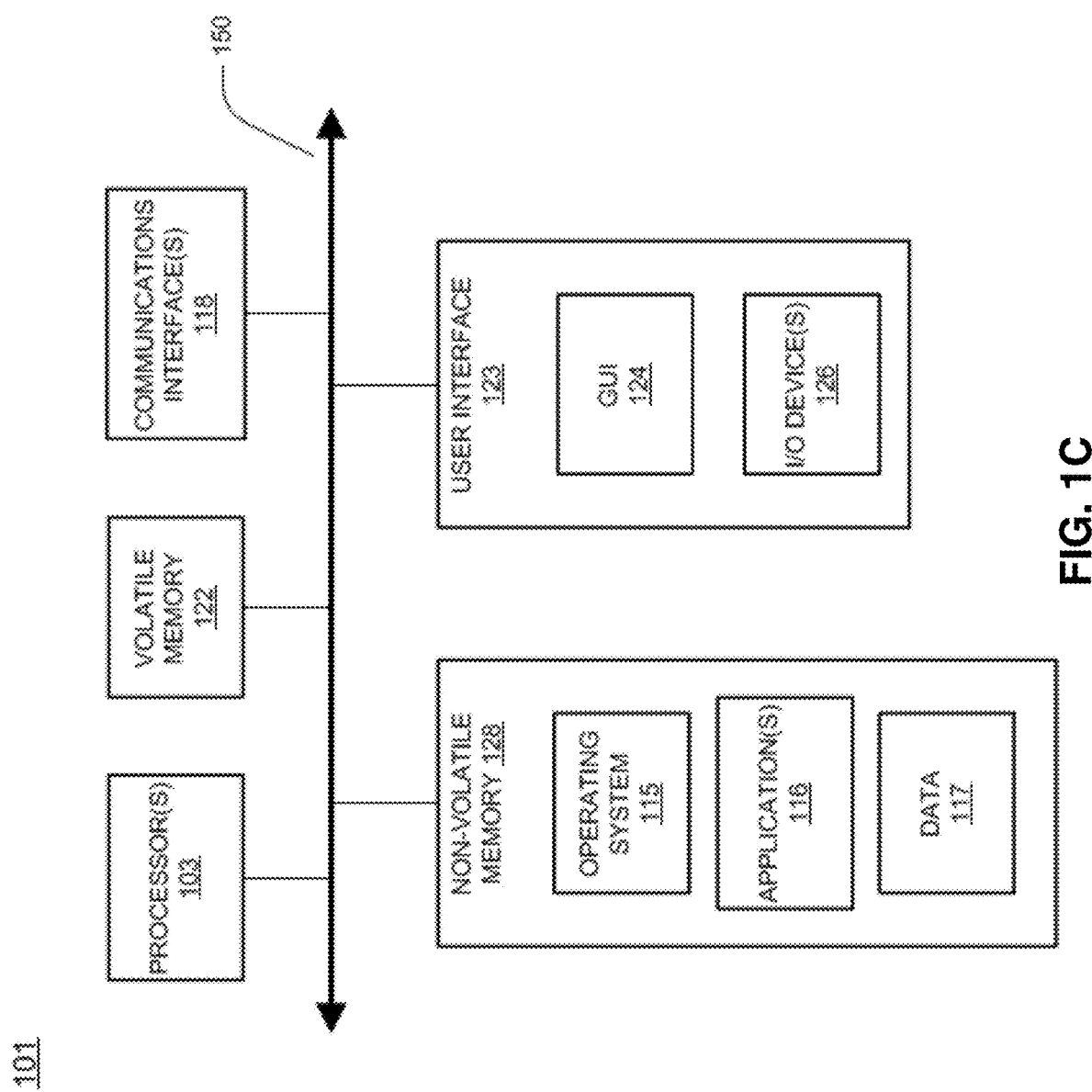

As shown in FIG. 1C, computer 101 may include one or more processors 103, volatile memory 52 (e.g., RAM), non-volatile memory 58 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 53, one or more communications interfaces 118, and communication bus 150. User interface 53 may include graphical user interface (GUI) 54 (e.g., a touchscreen, a display, etc.) and one or more input/output (I/O) devices 56 (e.g., a mouse, a keyboard, etc.). Non-volatile memory 58 stores operating system 115, one or more applications 116, and data 117 such that, for example, computer instructions of operating system 115 and/or applications 116 are executed by processor(s) 103 out of volatile memory 52. Data may be entered using an input device of GUI 54 or received from I/O device(s) 56. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

Figure 2:
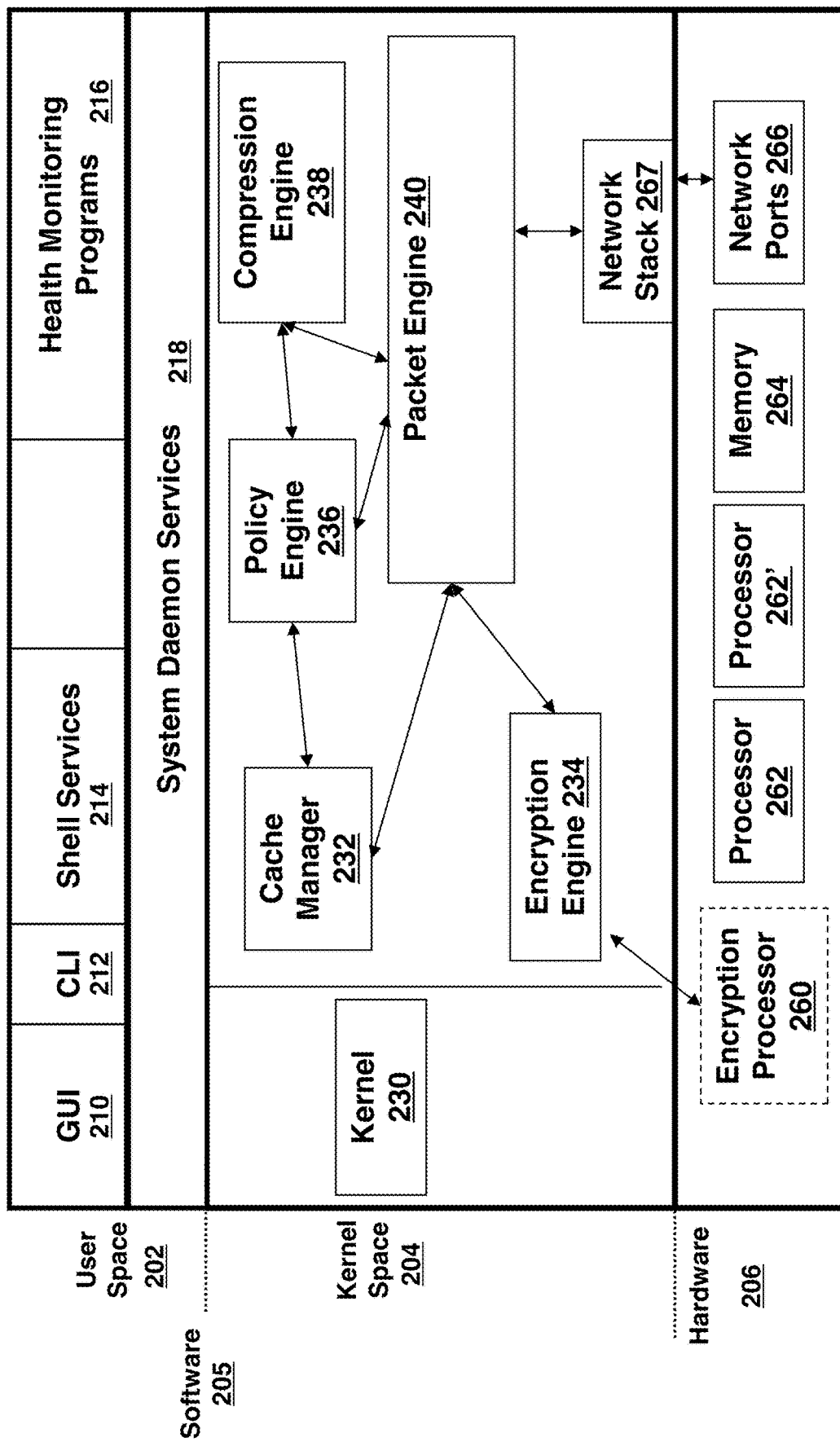
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 runs in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 50 for establishing and exchanging communications with appliance 200 and/or server 106 via a network 104. Client 102 may have installed and/or execute one or more applications that are in communication with network 104. Client agent 50 may intercept network communications from a network stack used by the one or more applications. For example, client agent 50 may intercept a network communication at any point in a network stack and redirect the network communication to a destination desired, managed or controlled by client agent 50, for example to intercept and redirect a transport layer connection to an IP address and port controlled or managed by client agent 50. Thus, client agent 50 may transparently intercept any protocol layer below the transport layer, such as the network layer, and any protocol layer above the transport layer, such as the session, presentation or application layers. Client agent 50 can interface with the transport layer to secure, optimize, accelerate, route or load-balance any communications provided via any protocol carried by the transport layer.

In some embodiments, client agent 50 is implemented as an Independent Computing Architecture (ICA) client developed by Citrix Systems, Inc. of Fort Lauderdale, Fla. Client agent 50 may perform acceleration, streaming, monitoring, and/or other operations. For example, client agent 50 may accelerate streaming an application from a server 106 to a client 102. Client agent 50 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 50 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

Figure 3:
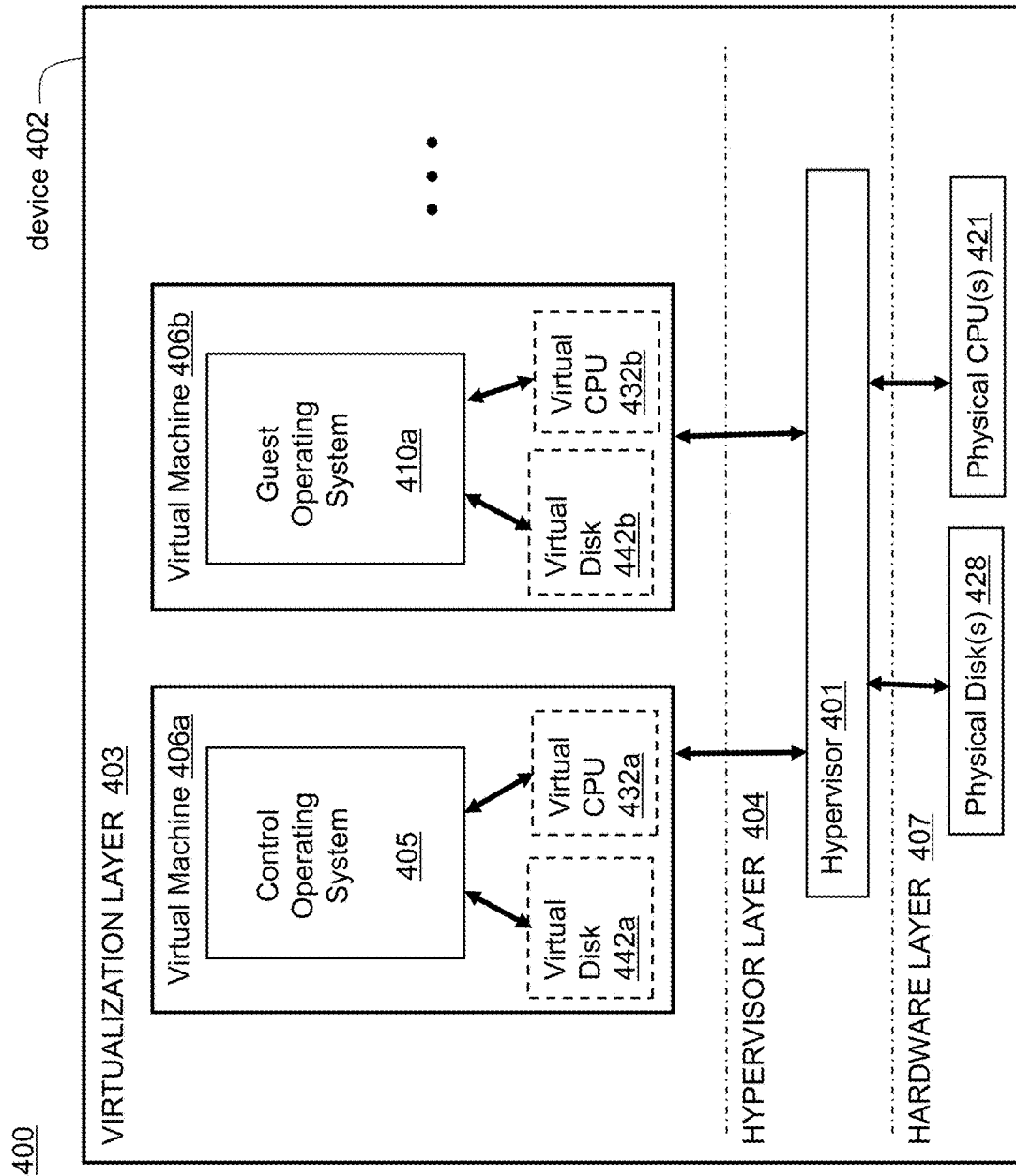
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

Figure 4:
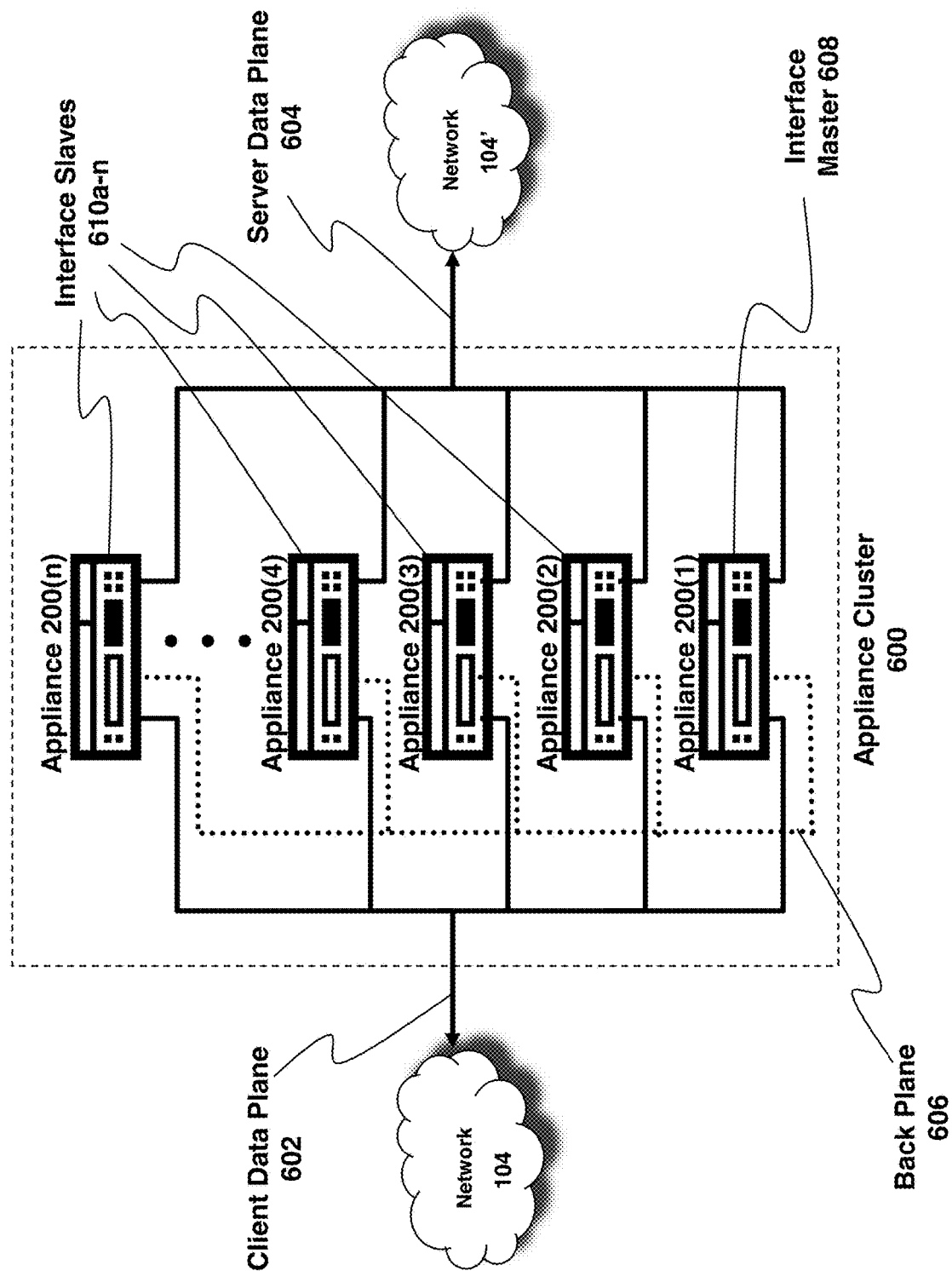
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly, to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

B. Applying an Application Layer Policy to a Transport Layer Security Request

The systems and methods described herein can apply an application layer policy to a transport layer security request. A device intermediary to one or more client devices and one or more servers can selectively allow or disable early data request (e.g., transport layer security (TLS) 1.3 requests) processing dynamically for each request. For example, the device can allow or reject early data requests for an application or resource provided by a server based in part on application layer policies generated for the particular application or resource provided by the server. The application layer policies can be generated to provide precise control of speed versus security tradeoffs for early data request processing based at least in part on polices applied to the respective requests.

In some embodiments, the device can process TLS data and application data (e.g., HTTP application data) together to combine the full flexibility of application-layer request-based policy rules with a TLS-layer early data control mechanism. Thus, application servers do not have to be modified to get the full benefit of TLS early data features (e.g., TLS 1.3's 0-RTT early data feature), yet the application servers can remain protected from early data replay attacks through use of the proxy device intermediary to the clients and application servers.

The device (e.g., proxy device) can include a TLS server (or TLS proxy) and a policy engine (e.g., HTTP policy engine). The device can process TLS requests and application requests received by one or more client devices. For example, a TLS request from the one or more client devices can include an application layer request for an application or resource provided by at least one server. In some embodiments, the device can proxy HTTP application requests to a backend HTTP application server. For example, the device can process the TLS and HTTP layers of an application request together before either forwarding the HTTP request to the application server or dropping the HTTP request (e.g., rejecting the application layer request).

The policy engine of the device can include one or more application-level policies for determining whether to accept or reject a request. In some embodiments, the device (e.g., proxy) can inspect application layer requests in the HTTP layer, yet takes conditional action according to the configured policy in the TLS layer (e.g., to either allow or disallow the early data request from being processed by an application server). For example, if the HTTP request for a resource matches a particular pattern (e.g., request URI matches a particular string) and the particular pattern has been identified using at least one application layer policy as a request to reject, the device can use the TLS layer to reject the early data request. The application layer policy can indicate that access to the resource or application is not replay-safe, for example, and instruct the device to reject early data requests for the resource or application (e.g., HTTP application). The application layer policies can be generated by an administrator of the device, by the device, an administrator of the application server, and/or the application server.

In some embodiments, the rejection of the early data can occur in the TLS layer when an "early_data" extension is omitted in a message (e.g., EncryptedExtensions message) that a server transmits during a TLS handshake or a client device transmits during a TLS handshake. The device can reject early data requests to reduce or eliminate the possibility of replay attacks. For example, a policy author (e.g., application layer policy) can identify one or more resources (e.g., application, URLs, methods) in one or more applications or provided by one or more application servers that are replay-safe and write a policy to allow early data processing just for those resources. The policy author (e.g., application layer policy) can identify one or more resources (e.g., application, URLs, methods) in one or more applications or provided by one or more application servers that are not replay-safe and write a policy to reject early data processing just for those resources. In some embodiments, policy authors (or application operators, administrators) can generate or customize a default policy rule that indicates whether early data processing is to be allowed or disallowed in the event that no other policy rule applies to the current request.

Figure 5:
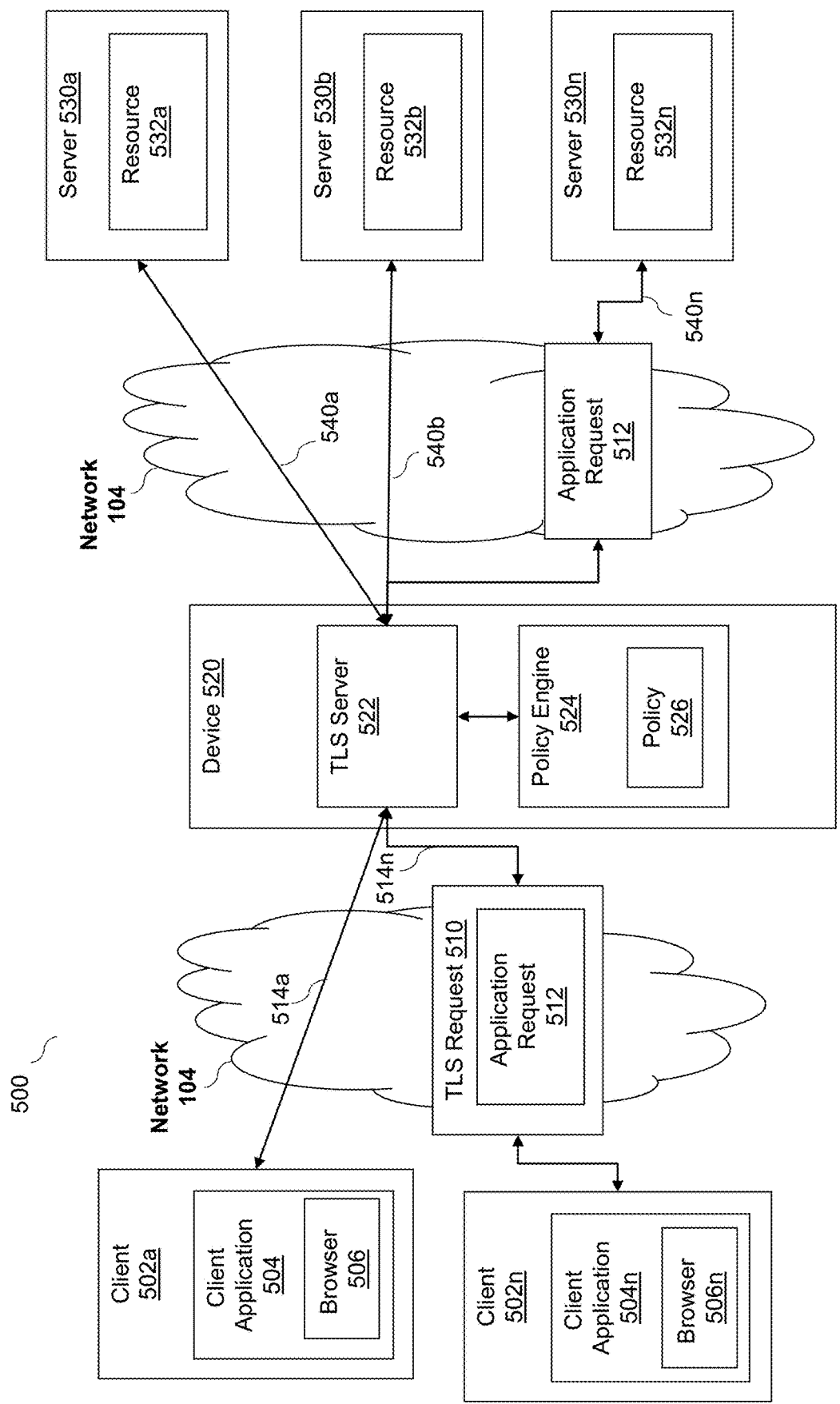
FIG. 5 is a block diagram of a system for applying application layer policy to a transport layer security request.

Referring to FIG. 5, depicted is a block diagram of a system 500 for applying an application layer policy to a transport layer security request. As depicted in FIG. 5, a plurality of client devices 502a-502n can transmit TLS requests 510 to a device 520 that is intermediary to the client device 502a-502n and a plurality of servers 530a-530n. The TLS requests 510 can include application layer requests 512 for at least one resource 532 provided by at least one server 530. The device 520 can apply application layer policies 526 to the TLS requests 510 to determine whether to accept or reject an application layer requests 512 included with the TLS request 510. The device 520 can use the application layer policies 526 to prevent and reject replay attacks for the resources 532a-532n provided by the servers 530a-530n.

The client devices 502a-502n can be an instance of any client device described herein. For example, the client devices 502a-502n can be the same as or substantially similar to at least one of clients 102(1)-102n of FIG. 1A or client 102 of FIG. 1B. The client devices 502a-502n can include client applications 504a-504n executing thereon. The client applications 504a-504n can include or provide browsers 506a-506n for the client devices 502a-502n to interact with resources 532a-532n hosted by the servers 530a-530n. The client applications 504a-504n may be any instance of any client application or appliance described herein. The client applications 504a-504n can include or be provided a device (e.g., intermediary device) or appliance. For example, the client applications 504a-504n can be the same as, substantially similar to, or be provided by appliances 200(1)-200(n) of FIG. 1A and appliance 200 of FIGS. 1B-2. The client applications 504a-504n with browsers 506a-506n (e.g., embedded browser (CEB)) can include a CEB. The browsers 506a-506n can include elements and functionalities of a web browser application or engine. The browsers 506a-506n can locally render one or more of resources 532a-532n as a component or extension of the client applications 504a-504n. For example, the browsers 506a-506n can render a SaaS/Web application inside the CEB which can provide the CEB with full visibility and control of at least one application session.

The device 520 can include an intermediary device that are disposed within a network 104 intermediary to the plurality of client devices 502a-502n and the plurality of servers 530a-530n. The device 520 can include servers, third party servers, proxy servers, HTTP proxyservers, or transport layer security (TLS) servers. The device 520 can be the same as or substantially similar to servers 106(1)-106n of FIG. 1A and server 106 of FIG. 1B. For example, the device 520 may include an application delivery system for delivering a computing environment, application, and/or data files to client devices 502a-502n. In some embodiments, the device 520 can correspond to a proxy server and include a TLS server 522 and a policy engine 524. The TLS server 522 can correspond to a server or TLS proxy. The TLS server 522 can provide or implement TLS protocol for communications security over network 104 (e.g., network 104 of FIG. 1A) between the plurality of clients 502a-502n and the plurality of servers 530a-530n.

The policy engine 524 can include or correspond to an HTTP policy engine. The policy engine 524 can include one or more application layer policies 526. For example, the policy engine 524 can include one or more application layer policies 526 for the resources 532a-532n provided by the servers 530a-530n. In some embodiment, the application layer policies 526 can indicate whether to allow or reject early data processing for one or more of the resources 532a-532n provided by the servers 530a-530n. For example, the application layer policies 526 can indicate that one or more of the resources 532a-532n are replay-safe and the application layer policies 526 allow early data processing for respective one or more of the resources 532a-532n provided by the servers 530a-530n. The application layer policies 526 can indicate that one or more of the resources 532a-532n are not replay-safe and the application layer policies 526 can reject or disallow early data processing for respective one or more of the resources 532a-532n provided by the servers 530a-530n.

In some embodiments, the application layer policies 526 can include default instructions to allow early data processing for one or more of the resources 532a-532n provided by the servers 530a-530n in the event that no other policy rule applies to respective one or more of the resources 532a-532n. The application layer policies 526 can include default instructions to reject or disallow early data processing for one or more of the resources 532a-532n provided by the servers 530a-530n in the event that no other policy rule applies to respective one or more of the resources 532a-532n. The application layer policies 526 can identify at least one resource 532, at least one server 530 or subset of servers 530a-530n of the plurality of servers 530a-530n. The application layer policies 526 can include a pattern corresponding to a resource 532. For example, the pattern can include an identifier, string, a URL, or a portion of URL corresponding to a resource 532. Thus, the policy engine 524 may control and manage the access to, and execution and delivery of, applications or resources 532a-532n provided by servers 530a-530n. For example, the TLS server 522 can use the policy engine 524 to determine whether a client device 502 may access a resource 532 and/or how the resource 532 should be delivered to the respective client device 502, such as a server-based computing, streaming or delivering the application locally to the respective client device 502 for local execution.

In embodiments, the device 520 can establish TLS connections 514a-514n with the client devices 502a-502n. The device 520 can establish application connections 540a-540n between at least one of the client devices 502a-502n and at least one of the servers 530a-530n. The connections 514a-514n, 540a-540n can include any type or form of a session as described herein. For example, connections 514a-514n, 540a-540n may include, but not limited to, an application session, an execution session, a desktop session, a hosted desktop session, a terminal services session, a browser session, a remote desktop session, a URL session and a remote application session. The connections 514a-514n, 540a-540n (e.g., TLS connections, application connections, application sessions) can include encrypted connections or secure connections established between a client device and a device and/or application server. For example, the connections 514a-514n, 540a-540n can include encrypted and/or secure sessions established between a resource 532 and a client device 502 and/or between device 520 and a client device 502. The connections 514a-514n, 540a-540n can include encrypted data or traffic transmitted between at least one resource 532 and a client device 502 and/or the device 520 and a client device 502.

The TLS requests 510 can include a TLS connection request and an application layer request 512. In some embodiments, the TLS requests 510 can include a first request to establish a TLS connection 514 with device 520 to a client device 502. The TLS requests 510 can include a second request or application layer request 512 to establish an application connection 540 to at least one server 530 of the plurality of servers 530a-530n to a client device 502. The TLS requests 510 can identify the device 520 to establish a TLS connection 514 with the client device 502. The TLS requests 510 can identify at least one server 530 of the plurality of servers 530a-530n to establish an application connection 540 with the client device 502. In some embodiments, the TLS requests 510 can identify at least one resource 532 hosted or provided by at least one server 530 of the plurality of servers 530a-530n. The application layer request 512 can identify at least one server 530 of the plurality of servers 530a-530n to establish an application connection 540 with the client device 502. In some embodiments, the application layer request 512 can identify at least one resource 532 hosted or provided by at least one server 530 of the plurality of servers 530a-530n. For example, the application layer request 512 can include a HTTP request. The application layer request 512 can include a pattern corresponding to a resource 532 provided by at least one server 530 of the plurality of servers 530a-530n. In some embodiments, the application layer request 512 can include an identifier, string, a URL, or a portion of URL corresponding to a resource 532 provided by at least one server 530 of the plurality of servers 530a-530n.

The servers 530a-530n can be the same as or substantially similar to servers 106(1)-106n of FIG. 1A and server 106 of FIG. 1B. For example, the servers 530a-530n may include an application delivery system for delivering a computing environment, resources 532a-532n, and/or data files to client devices 502a-502n. The servers 530a-530n can include remote severs or third party servers that host one or more resources 532a-532n. The servers 530a-530n can include HTTP servers or application servers. The resources 532a-532n may include resources provided by or hosted by the servers 530a-530n. For example, the resources 532a-532n may include network applications that are served from and/or hosted on the servers 530a-530n. The resources 532a-532n can include an application hosted on at least one server 530 accessed by at least one client device 502 via a network 104. The resources 532a-532n can include, but not limited to, a web application, a desktop application, remote-hosted application, a virtual application, a software as a service (SaaS) application, a mobile application, an HDX application, a local application, a native application (e.g., native to the client device), and/or a device couple with one or more of the client devices 502a-502n.

Network 104 may be a public network, such as a wide area network (WAN) or the Internet. In some embodiments, network 104 may be a private network such as a local area network (LAN) or a company Intranet. Network 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

Each of the above-mentioned elements or entities is implemented in hardware, or a combination of hardware and software, in one or more embodiments. Each component of the client applications 504a-504n may be implemented using hardware or a combination of hardware or software detailed above in connection with FIGS. 1A-4. For instance, each of these elements or entities can include any application, program, library, script, task, service, process or any type and form of executable instructions executing on hardware of a client device (e.g., the client device 502). The hardware includes circuitry such as one or more processors in one or more embodiments.

Figure 6B:
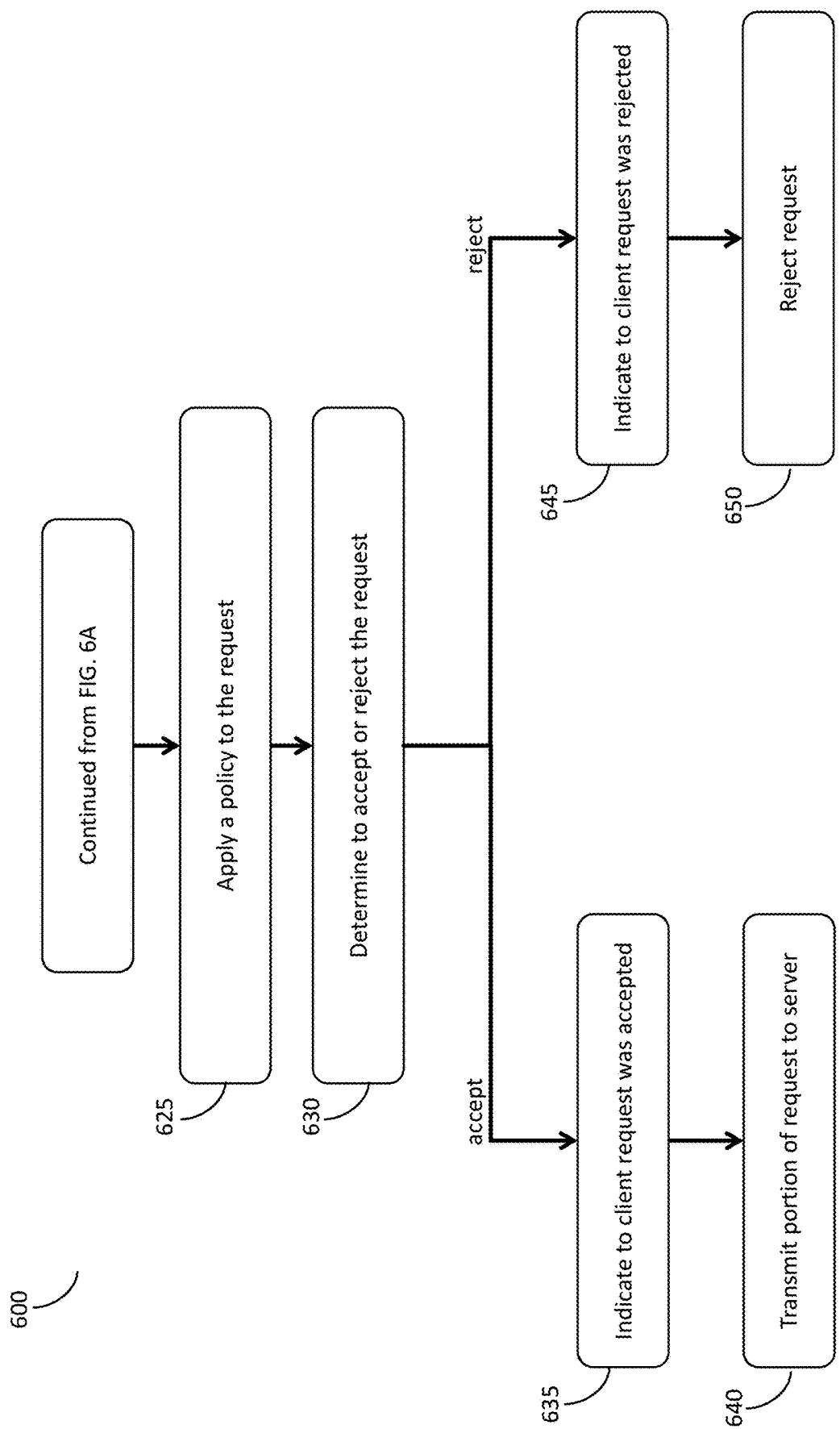

Referring now to FIGS. 6A-6B, depicted is a flow diagram of one embodiment of a method 600 for applying an application layer policy to a transport layer security request. The functionalities of the method 600 may be implemented using, or performed by, the components detailed herein in connection with FIGS. 1-5. In brief overview, a request can be received (605). A protocol can be determined (610). A key corresponding to the client can be validated (615). The request can be decrypted (620). A policy can be applied to the request (625). A determination can be made to accept or reject the request (630). If the request is accepted, a response can be generated to indicate to the client the request was accepted (635). A portion of the request can be transmitted to a server (640). If the request is rejected, a response can be generated to indicate to the client the request was rejected (645). The request can be rejected (650).

Referring now to operation (605), and in some embodiments, a request 510 can be received. For example, method 600 can include receiving, by a device 520 intermediary to one or more clients 502 and one or more servers 530, a transport layer security (TLS) request 510 to establish a TLS connection 514 between a client device 502 of the one or more clients 502 and a server 530 of the one or more servers 530. The TLS request 510 can include an application layer request 512 to a resource 532 of the server 530. In some embodiments, the TLS request 510 can identify one or more servers 530 of the plurality of servers 530a-530n to establish an application connection 540 with a client device 502. The TLS request 510 can identify a resource 532 hosted or provided by at least one server 530 of the plurality of servers 530a-530n.

The application layer request 512 can include a Hyper-Text Transfer Protocol (HTTP) request. For example, the application layer request 512 can identify at least one server 530 (e.g., HTTP server) of the plurality of servers 530a-530n to establish an application connection 540. In some embodiments, the application layer request 512 can identify at least one resource 532 hosted or provided by at least one server 530 of the plurality of servers 530a-530n. The application layer request 512 can include a pattern for matching against at least a portion of an application layer policy 526. For example, the application layer request 512 can include a pattern corresponding to a resource 532 provided by at least one server 530 of the plurality of servers 530a-530n. In some embodiments, the application layer request 512 can include an identifier, string, a URL, or a portion of URL corresponding to a resource 532 provided by at least one server 530 of the plurality of servers 530a-530n. The client device 502 can transmit a TLS request 510 to the device 520. The client device 502 can transmit a plurality of TLS requests 510 to the device 520. In some embodiments, a plurality of client devices 502a-502n can transmit a TLS request 510 to the device 520. A plurality of client devices 502a-502n can transmit a plurality of TLS requests 510 to the device 520.

The device 520 can be positioned within a network 104 intermediary to the plurality of clients 502a-502n and a plurality of servers 530a-530n. For example, the device 520 can include intermediary devices disposed between one or more clients 502a-502n and one or more servers 530a-530n, such as but not limited to, HTTP servers. The device 520 can include servers, third party servers or TLS servers 522. The device 520 can include a TLS server 522 and a policy engine 526. The TLS server 522 can implement TLS protocol to provide communications security over a network 104. In some embodiments, the TLS server 522 can implement the TLS protocol to provide communications security over a network 104. The device 520 can establish an application connection 540 between a client device 502 and a server 530. The device 520 can establish a TLS connection 514 between a client device 502 and the device 520. In some embodiments, the device can establish a plurality TLS connections 514a-514n to one or more client devices 502a-502n responsive to a plurality of TLS requests 510. For example, a TLS connection 514 can be established responsive to each TLS request 510. In some embodiments, the device 520 can selectively establish TLS connections 514a-514n responsive to TLS requests 510 based in part application layer policies 526. The TLS connections 514a-514n can be established between the client devices 502a-502n and the device 520.

Referring now to operation (610), and in some embodiments, a protocol can be determined. In some embodiments, the device 520 and a client device 502 transmitting a TLS request 510 can negotiate an application protocol to use for the TLS request 510. The application protocol can include, but not limited to HTTP protocol. For example, the device 520 and client device 502 can negotiate using application layer protocol negotiation to determine a protocol for the TLS request 510. The device 220 can negotiate or determine an application protocol through application layer protocol TLS extension. The application layer negotiation can be performed over a secure connection between the device 520 and the client device 502. In some embodiments, the application layer negotiation can be performed independent of the application layer protocols. For example, the device 520 and client device 502 can use out-of-band negotiation to determine a protocol for the TLS request 510. The device 520 and client device 502 can use out-of-band data to process the TLS request 510. The device 520 can determine to use HTTP protocol responsive to the negotiation.

Referring now to operation (615), and in some embodiments, a key corresponding to the client device 502 can be validated. For example, the TLS request 510 can include a key or verification tool. In some embodiments, the client device 502 can pre-share a key with the device 520 or TLS server 522 prior to transmitting the TLS request 510. The key can include a verification tool or unique identifier corresponding to the client device 502. The device 520 or TLS server 522 can receive or accept the key and validate the client device 502 using the key. In some embodiments, the key can include encryption or decryption data. For example, the device 520 or TLS server 522 can use the key to decrypt early application data received from the client device 502. In some embodiments, the client device 502 can include an early data extension value, early data extension indication, or early data extension identifier in application layer request 512. In some embodiments, when a pre-shared key is used and early data is allowed for the pre-shared key, the client device 502 can transmit the TLS request 510 and/or application layer request 512 having both the early data extension and the pre-shared key extension. The device 520 can search the TLS request 510 or respective application layer request 512 to determine if an extension for early data is included in the TLS request 510 or application layer request 512 transmitted during the TLS handshake with the client device 502. The extension for early data can be included in an encrypted extension message included with the TLS request 510 or application layer request 512.

Referring now to operation (620), and in some embodiments, the request 510, 512 can be decrypted. For example, the device 520 can decrypt the TLS request 510, the application layer request 512, or both the TLS request 510 and the application layer request 512. In some embodiments, the TLS request 510 and/or application layer request 512 received at the device 520 can be encrypted. The device 520 can receive the encrypted TLS request 510 and decrypt the encrypted TLS request 510. The decrypted TLS request 510 can be analyzed within the device 520. In some embodiments, the decrypted TLS request 510 can be analyzed by the TLS server 522 using the policy engine 524. The device 520 can receive the encrypted application layer request 512 and decrypt the application layer request 512. The decrypted application layer request 512 can be analyzed within the device 520. In some embodiments, the decrypted application layer request 512 can be analyzed by the TLS server 522 using the policy engine 524. In some embodiments, if the negotiated application protocol is HTTP, the decrypted HTTP application layer request 512 can be analyzed within the device 520 and compared against the configured early data acceptance policy (e.g., application layer policies 526).

Referring now to operation (625), and in some embodiments, a policy 526 can be applied to the request 510. The application layer policies 526 can be stored by the policy engine 524 (e.g., HTTP policy engine). The application layer policies 526 can include, but not limited to, early data acceptance policies. The application layer policies 526 can include, but not limited to, HTTP policies. The application layer policies 526 can be generated by one or more of the servers 530a-530n. For example, the servers 530a-530n can generate application layer policies 526 to control access to one or more resources 532a-532n hosted or provided by the respective server 530. The application layer policies 526 can be generated by administrators of servers 530a-530n. In some embodiments, the device 520 or TLS server 522 can generate application layer policies 526 to control access to one or more resources 532a-532n hosted or provided by the respective server 530. The application layer policies 526 can be generated by administrators of the device 520 or TLS server 522. The application layer policies 526 can allow to disallow early data requests for the one or more resources 532a-532n hosted or provided by the respective server 530. The application layer policies 526 may indicate that the one or more resources 532a-532n hosted or provided by the respective server 530 are replay-safe. The application layer policies 526 may indicate that the one or more resources 532a-532n hosted or provided by the respective server 530 are not replay-safe.

The application layer policies 526 can be generated for accessing resources 532a-532n of a particulate server 530 and/or for a particular resource 532. The application layer policies 526 can specify a pattern for matching against at least a portion of a TLS request 510 and/or application layer request 512. The application layer policies 526 can include a pattern for matching against at least a portion of a TLS request 510 and/or application layer request 512. For example, the application layer policies 526 can include a pattern corresponding to a resource 532 provided by at least one server 530 of the plurality of servers 530a-530n. In some embodiments, the application layer polices 526 can include an identifier, string, a URL, or a portion of URL corresponding to a resource 532 provided by at least one server 530 of the plurality of servers 530a-530n.

The device 520 or TLS server 522 can apply one or more of the application layer policies 526 to the TLS request 510, to the application layer request 512, or to both the TLS request 510 and the application layer request 512. The application layer polies 526 can be used by the device 520 to control access to the resources 532a-532n provided by the servers 530a-530n. In some embodiments, the device 520 can identify an application layer policy 526 based at least in part on the TLS request 510, the application layer request 512, or both the TLS request 510 and the application layer request 512. The application layer policy 526 can correspond to a policy for accessing one or more resources 532a-532n provided by the servers 530a-530n. For example, the application layer policies 526 can indicate if a particular resource 532 is replay-safe and, if so, the corresponding application layer policy 526 can include instructions or a policy to allow early data processing for the respective resource 532. The application layer policies 526 can indicate if a particular resource 532 is not replay-safe and, if so, the corresponding application layer policy 526 can include instructions or a policy to prevent or otherwise disallow early data processing for the respective resource 532.

The application layer policies 526 can be generated having default instructions for resources 532a-532n in which no early data processing polices have been written or generated. For example, the application layer policies 526 can include a default policy rule that indicates whether early data processing is to be allowed or disallowed in the event that no other policy rule applies to the current request. In some embodiments, the application layer policies 526 can include a default policy rule that indicates that early data processing is to be allowed in the event that no other policy rule applies to a TLS request 510, application layer request 512, or requested resource 532. For example, the application layer policy 526 or the policy engine 524 can include a default policy indicating that early data requests are allowed by default. The application layer policy 526 or the policy engine 524 can include black-list including exemptions to the default policy that includes or enumerates specific resources 532-532n which are not allowed in early data requests. In some embodiments, the application layer policies 526 can include a default policy rule that indicates that early data processing is to be prevented or disallowed in the event that no other policy rule applies to a TLS request 510, application layer request 512, or requested resource 532. For example, the application layer policy 526 or the policy engine 524 can include a default policy indicating that early data requests are not allowed by default. The application layer policy 526 or the policy engine 524 can include white-list including exemptions to the default policy that includes or enumerates specific resources 532-532n which are allowed in early data requests.

Referring now to operation (630), and in some embodiments, a determination can be made to accept or reject the request 510, 512. In some embodiments, the device 520, responsive to applying the application layer policy 526 to the application layer request 512 of the TLS request 510, can determine whether to accept or reject at least the application layer request 512 of the TLS request 510. The device 520 can compare a pattern included in the application layer policy 526 to a pattern included in the TLS request 510, application layer request 512, or a pattern included in both the TLS request 510, application layer request 512. In some embodiments, if the pattern included in the TLS request 510, application layer request 512, or both the TLS request 510, application layer request 512, the device 520 can determine to accept or reject the request 510, 512 based in part on the instructions in the corresponding application layer policy 526.

Referring now to operation (635), and in some embodiments, if the request 510, 512 is accepted, a response can be generated to indicate to the client device 502 the request 510, 512 was accepted. The device 520 can determine to accept the TLS request 510, the application layer request 512, or both the TLS request 510, the application layer request 512. The device 520 can determine accept the TLS request 510, application layer request 512, or both the TLS request 510 and the application layer request 512 using the TLS layer or in the TLS layer. In some embodiments, the device 520 can include an extension for early data during a TLS handshake with the client device 502 to indicate allowing both the TLS request 510 and the application layer request 512. For example, if the application layer policy 526 evaluation results in an allow early data decision, the device 520 can indicate to the client device 502 (e.g., via the EncryptedExtensions message in the TLS handshake) that both the TLS request 510 and the application layer request 512 are accepted. In some embodiments, the device 520 can generate an early data extension in an encrypted extension message (e.g., "early_data" extension in EncryptedExtensions) indicating to the client device 502 if the device 520 intends to allow (e.g., process) the TLS request 510 and application layer request 512 for early data. In some embodiments, the device 520 can establish a TLS connection 514 with the client device 502 responsive to accepting the TLS request 510. The TLS connection 514 can include an encrypted connection between the device 520 and the client device 502.

Referring now to operation (640), and in some embodiments, a portion of the request can be transmitted to a server. The device 520 can transmit the application layer request 512 to a server 530 of the plurality of servers 530a-530n indicated in the respective application layer request 512. In some embodiments, the device 520 can transmit or forward the HTTP request 512 to server 530 (e.g., HTTP server) of the plurality of servers 530a-530n indicated in the respective application layer request 512. The device 520 or the TLS server 522 can proxy an application connection 540 between the client device 502 and the server 530. For example, the device 520 can establish an application connection 540 with the server 530 of the plurality of servers 530a-530n indicated in the respective application layer request 512. The device 520 can establish an application connection 540 with the client device 502 that transmitted the application layer request 512. In some embodiments, the device 520 can establish the application connection 520 between the client device 502 that transmitted the application layer request 512 and the server 530 indicated in the respective application layer request 512. In some embodiments, the application connection 540 (e.g., communication channel) between the device 520 (or TLS server 522) and the server 532 (e.g., HTTP (application) server) can include or be formed as an encrypted channel. For example, the client device 502 may reside in the proxy or device 520 and forward application layer requests 512 (e.g., HTTP request) to a separate TLS server 522 disposed at or inside the server 530 (e.g., HTTP (application) server). In some embodiments, the device 520 can terminate at the device 520 the TLS connection 514 with the client device 502. For example, the device 520 can terminate at the device 520 the TLS connection 514 between the client device 502 and the device 520 and establish a communication channel or session between the device 520 and the server 530. In some embodiments, the communication channel or session between the device 520 and the server 530 may not include TLS protocol or a TLS communication channel.

Referring now to operation (645), and in some embodiments, if the request 510, 512 is rejected, a response can be generated to indicate to the client device 502 the request 510, 512 was rejected. The device 520 can reject the TLS request 510, the application layer request 512, or both the TLS request 510 and the application layer request 512. The device 520 can determine to reject the TLS request 510, application layer request 512, or both the TLS request 510 and the application layer request 512 using the TLS layer or in the TLS layer. For example, the device 520 can omit an extension for early data during the TLS handshake with the client device 502 to indicate acceptance of the TLS request 510 and rejection of the application layer request 512. For example, the application layer policy 526 evaluation results in a rejection or disallow early data decision, the device 520 can indicate to the client device 502 that the TLS request 510 is accepted and that the application layer request 512 is rejected. The device 520 can discard the decrypted application layer request 512. In some embodiments, the device 520 can carry out the TLS handshake, omitting the early data extension in an encrypted extension message (e.g., "early_data" extension in EncryptedExtensions) indicating to the client device 502 that the device 520 intends to reject the request for early data.

Referring now to operation (650), and in some embodiments, the request 510, 512 can be rejected. The device 520 can reject the TLS request 510, the application layer request 512, or both the TLS request 510 and the application layer request 512. In some embodiments, the device 520 can accept the TLS request 510 and reject the application layer request 512. For example, the device 520 can establish a TLS connection 514 between the client device 502 and the device 520 and reject the application layer request 512. The TLS connection 514 can include an encrypted connection between the device 520 and the client device 502.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method for applying an application layer policy to a transport layer security request, the method comprising:
   (a) receiving, by a device intermediary to one or more clients and one or more servers, a transport layer security (TLS) request to establish a TLS connection between a client of the one or more clients and a server of the one or more servers, the TLS request including an application layer request to connect to a resource of the server;
   (b) determining, by the device during a TLS handshake between the device and the client and prior to forwarding the application layer request to the resource of the server, whether the application layer request is replay-safe based on a pattern specified by an application layer policy matching a uniform resource identifier of the application layer request; and
   (c) accepting or rejecting, by the device responsive to the determination as to whether the application layer request is replay-safe based on the pattern specified by the application layer policy, at least the application layer request of the TLS request, wherein accepting the application layer request causes the device to establish, responsive to the TLS request, the TLS connection between the client and the server.

2. The method of claim 1, wherein (c) further comprises rejecting the application layer request but accepting the TLS request.

3. The method of claim 2, further comprising omitting, by the device, an extension for early data during the TLS handshake with the client to indicate rejection of the application layer request.

4. The method of claim 1, wherein (c) further comprises accepting both the TLS request and the application layer request.

5. The method of claim 4, further comprising including, by the device, an extension for early data during the TLS handshake with the client to indicate allowing the application layer request.

6. The method of claim 1, wherein (b) further comprises decrypting, by the device, the application layer request using at least one key included within the TLS request.

7. The method of claim 1, further comprising identifying, by the device based at least on the TLS request, the application layer policy for accessing the resource.

8. The method of claim 1, wherein the application layer policy specifies the pattern for matching against at least a portion of the application layer request.

9. The method of claim 1, wherein the application layer request comprises a HyperText Transfer Protocol (HTTP) request.

10. The method of claim 1, further comprising terminating, at the device, the TLS connection with the client and establishing a communication channel between the device and the server.

11. A system for applying an application layer policy to a transport layer security request, the system comprising:
    a device intermediary to one or more clients and one or more servers, wherein the device is configured to:
      receive a transport layer security (TLS) request to establish a TLS connection between a client of the one or more clients and a server of the one or more servers, wherein the TLS request includes an application layer request to connect to a resource of the server;
      determine, during a TLS handshake between the device and the client and prior to forwarding the application layer request to the resource of the server, whether the application layer request is replay-safe based on a pattern specified by an application layer policy matching a uniform resource identifier of the application layer request; and
      accept or reject, responsive to the determination as to whether the application layer request is replay-safe based on the pattern specified by the application layer policy, at least the application layer request of the TLS request, wherein accepting the application layer request causes the device to establish, responsive to the TLS request, the TLS connection between the client and the server.

12. The system of claim 11, wherein the device is further configured to reject the application layer request but accept the TLS request.

13. The system of claim 12, wherein the device is further configured to omit an extension for early data during the TLS handshake with the client to indicate rejection of the application layer request.

14. The system of claim 11, wherein the device is further configured to accept both the TLS request and the application layer request.

15. The system of claim 14, wherein the device is further configured to include an extension for early data during the TLS handshake with the client to indicate allowing the application layer request.

16. The system of claim 11, wherein the device is further configured to decrypt the application layer request using at least one key included within the TLS request.

17. The system of claim 11, wherein the device is further configured to identify, based at least on the TLS request, the application layer policy for accessing the resource.

18. The system of claim 11, wherein the application layer policy is configured with the pattern for matching against at least a portion of the application layer request.

19. The system of claim 11, wherein the application layer request comprises a HyperText Transfer Protocol (HTTP) request.

20. The system of claim 11, wherein the device is further configured to terminate the TLS connection with the client and establishing a communication channel between the device and the server.

* * * * *